United States Patent [19]
Ooi

[11] Patent Number: 5,579,498
[45] Date of Patent: Nov. 26, 1996

[54] PIPELINED DATA PROCESSING SYSTEM CAPABLE OF STALLING AND RESUMING A PIPELINE OPERATION WITHOUT USING AN INTERRUPT PROCESSING

[75] Inventor: Yasushi Ooi, Tokyo, Japan

[73] Assignee: NEC Corporation, Tokyo, Japan

[21] Appl. No.: 617,427

[22] Filed: Mar. 18, 1996

Related U.S. Application Data

[63] Continuation of Ser. No. 270,588, Jul. 5, 1994, abandoned.

[30] Foreign Application Priority Data

Jul. 5, 1993 [JP] Japan .................................. 5-165612

[51] Int. Cl.$^6$ ...................................................... G06F 9/38
[52] U.S. Cl. ................. 395/595; 364/231.8; 364/948.34
[58] Field of Search ...................................... 395/375, 800

[56] References Cited

U.S. PATENT DOCUMENTS

| | | | |
|---|---|---|---|
| 4,482,983 | 11/1984 | Slechta, Jr. .............................. | 395/550 |
| 4,750,112 | 6/1988 | Jones et al. ............................. | 395/375 |
| 5,125,088 | 6/1992 | Culley .................................... | 395/500 |
| 5,150,469 | 9/1992 | Jouppi .................................... | 395/375 |
| 5,203,003 | 4/1993 | Donner .................................... | 395/800 |
| 5,274,796 | 12/1993 | Conner .................................... | 395/550 |
| 5,313,621 | 5/1994 | Chan ....................................... | 395/550 |

FOREIGN PATENT DOCUMENTS

| | | |
|---|---|---|
| 0354590A2 | 8/1989 | European Pat. Off. . |
| 60-10355 | 1/1985 | Japan . |
| 60-37038 | 2/1985 | Japan . |
| 60-037038 | 2/1985 | Japan . |

OTHER PUBLICATIONS

European Search Report—EP 94 11 0435, dated 12 Oct. 1994.
Patent Abstracts of Japan, JP4205425, 30 Nov. 1990; Ide Toshinao, "Data Processor and its Data Processing Method".
IAX 86, 88, 186 and 188 User's Manual (Programmer's Reference) pp. 3–167 and 4–4.
IBM Technical Disclosure Bulletin, vol. 15, No. 2, Jul. 1972, "Power Consumption Controlling System", pp. 540–542, by W. G. Bouricius, et al.
Patterson et al.; "Computer Architecture: A Quantative Approach", 1990 by Morgan Kaufmann Publishers Inc., §6.4 The Major Hurdle with Pipelining—Pipe–line Hazard; pp. 292–317.

Primary Examiner—William M. Treat
Assistant Examiner—Kenneth R. Coulter
Attorney, Agent, or Firm—Whitham, Curtis, Whitham & McGinn

[57] ABSTRACT

A pipelined data processing system has an instruction set containing a stall instruction, and includes a plurality of stages and a pipeline controller for controlling execution and stall of a pipeline operation. The pipeline controller is configured to put the stages into a "frozen" condition on the basis of a stall signal generated by execution of the stall instruction, and to return the stages from the "frozen" condition to a "run" condition on the basis of an output pulse generated by a timer designated by an operand part of the stall instruction.

14 Claims, 5 Drawing Sheets

PIPELINED DATA PROCESSING SYSTEM CAPABLE OF STALLING AND RESUMING A PIPELINE OPERATION WITHOUT USING AN INTERRUPT PROCESSING

This is a continuation of application Ser. No. 08/270,588 filed Jul. 5, 1994, now abandoned.

BACKGROUND OF THE INVENTION

1. Field of the Invention

The present invention relates to a data processing system, and more specifically to a pipelined data processing system including a synchronous instruction for controlling a stalling and a resumption of a pipelined processing.

2. Description of Related Art

In data processing systems for a signal processing, a system configured to start its processing in synchronism with a periodical event is the most fundamental system. In the signal processing for an audio signal or an image signal, it is an ordinary practice that new data is supplied to the data processing system in synchronism with a sampling rate of the signal, and the data processing system starts a filtering processing or a predicting processing in response to arrival of the data.

In the case that the signal processing is executed in a programmable data processing system such as a CPU (central processing unit) or a DSP (digital signal processor), the number of execution steps changes dependently upon a conditional branch and other factors, and therefore, a periodical event is preferably supplied to the data processing system as an external factor.

In addition, the data processing system is required to have a sufficiently high operation speed for the purpose of complying with a real time signal processing. One means meeting this demand is a pipeline processing in which an instruction execution process is divided into a plurality of stages, for example, an instruction fetch stage (IF), an instruction decode stage (ID), an execution stage (EX1) and a writing stage (WB), so that these stages are simultaneously operated and a stream of instructions are executed in a multiplexed manner.

Furthermore, an interrupt is conventionally used as a means for notifying generation of the periodical event to the data processing system as the external factor. For example, a pulse signal periodically outputted from a timer is supplied to an interrupt request terminal of the data processing system as an interrupt request signal, and a processing to be periodically performed is executed in an interrupt processing routine started by the data processing system when the data processing system has acknowledged the interrupt request.

In addition, if there are a plurality of causes for processings to be periodically performed, it is necessary that the interrupt processing is multiplexed, and therefore, it is necessary to give an order of priority to the plurality of interrupt causes. Accordingly, the system becomes further complicated, and overhead becomes large because of various register savings in a multiple interrupt processing.

Under this circumstance, Japanese Patent Application Laid-open Publication No. JP-A-60-037038 has proposed a means for solving complexity in the multiple interrupt processing, in a microcomputer having a plurality of interrupt causes releasing a halt mode. This will be called a "prior art 1" hereinafter. The microcomputer disclosed in the prior art 1 is configured to select, by means of a program, whether each of the interrupt causes releasing the halt mode releases the halt mode and then performs another interrupt processing, or simply releases the halt mode so as to advance a main program. In response to some timer signals designated by a cause designation instruction, of the plurality of timer signals, it is possible to simply resume the program from a next instruction. Namely, some of the interrupt causes can be processed in a main program.

Furthermore, Japanese Patent Application Laid-open Publication No. JP-A-60-010355 has proposed a method for measuring a utilization rate in a central processing unit by use of a timer counter and an interrupt. In brief, JP-A-60-010355 discloses that a special instruction (halt instruction) is executed in the case of no load so as to start a counting, and when the system is returned to an operating condition, the counting is stopped by an interrupt.

In conclusion, in the pipelined processing system, when a stream of instructions are sequentially executed, a high execution efficiency can be obtained. However, it is a problem that the flow of the pipeline operation is disturbed by for example a conditional branch. In particular, when there occurs an unexpected change of the instruction sequence by for example generation of an external interrupt, the execution of succeeding instructions in the pipeline operation is interrupted, and it is required to newly supply an interrupt processing instruction to the pipelined system. Accordingly, when the external interrupt frequently occurs, the execution efficiency drops remarkably.

Therefore, if the pipelined data processing system performs the signal processing in synchronism with a plurality of timer means (constituting a plurality of interrupt causes) in a multiple interrupt processing mode, the processing efficiency drops.

On the other hand, the prior art 1 discloses a low power consumption microcomputer so adapted that a system clock is stopped in a condition other than an operating condition. Therefore, the stalling and resuming of an instruction is controlled by the stalling and resuming of a timing generator for generating the system clock. However, the stalling and resuming of the system clock results in that a dynamic circuit (in which a stored information will disappear due to the stalling of the system clock) cannot be used. In this connection, it is difficult to identify a range of circuits which allow the stalling and resuming of the system clock.

Furthermore, the prior art 1 is disadvantageous in that it is necessary to minimize a clock skew between the processing system that executes the stalling and resuming of the system clock, and a timer located at an external of the processing system. Because of this reason, it is difficult to apply the processing system based on the prior art 1, to a real-time synchronous processing such as the signal processing.

SUMMARY OF THE INVENTION

Accordingly, it is an object of the present invention to provide a pipelined data processing system which has overcome the above mentioned defect of the conventional one.

Another object of the present invention is to provide a pipelined data processing system capable of performing the pipeline operation properly in synchronism with an output signal of a timer, without using an interrupt processing.

The above and other objects of the present invention are achieved in accordance with the present invention by a data processing system having a pipelined structure in which an instruction execution process is divided into a plurality of stages, the data processing system having an instruction set containing a stall instruction, and comprising a pipeline control means for controlling the execution and stall of a pipeline operation, the pipeline control means being configured to put the stages into a "frozen" condition on the basis of a stall signal generated by execution of the stall instruction, and to return the "frozen" condition to a "run" condition on the basis of an output signal generated by a pipeline operation resume means designated by the stall instruction.

In an embodiment of the data processing system, the stall instruction includes an operand part designating the pipeline operation resume means.

In addition, the pipeline operation resume means includes at least one timer periodically generating a predetermined pulse signal.

In a more preferred embodiment of the data processing system, the pipeline control means includes a memory means for storing a setting and a releasing of the stall of the pipeline operation, the memory means having a set terminal connected to receive a decoded signal of the stall instruction outputted from an instruction decode stage in the pipelined structure, an output of the memory means being supplied to a plurality of stage registers in the pipelined structure so as to inhibit a writing to each of the stage registers when the memory means is in a set condition, the memory means also including a reset terminal connected to receive the output signal generated by the pipeline operation resume means designated by the stall instruction, so that when the memory means is in a reset condition, the writing to each of the stage registers is allowed.

For storing a setting and a releasing of the stall of the pipeline operation, alternatively, the pipeline control means can include a memory means and a gate means in combination, or only a gate means.

In another preferred embodiment of the data processing system, the pipeline control means includes a selection means for selecting from a plurality of pipeline operation resume means, one designated by the stall instruction. In addition, the pipeline control means can include a means for resetting the designation of the pipeline operation resume means by the stall instruction, when the stall instruction is transferred to a second execution stage and if an instruction next to the stall instruction is not a stall instruction.

With the above mentioned arrangement, the data processing system in accordance with the present invention has the instruction set containing the stall instruction, and when the stall instruction is decoded, the stall signal is supplied to the pipeline control means, which in turn operates to stall the pipeline operation on the basis of the stall signal. Thus, the pipeline operation can be temporarily stalled in a program operation. In addition, the pipeline operation can be resumed in synchronism with the output signal of the pipeline operation resume means, which is directly supplied to the pipeline control means.

Accordingly, the data processing system in accordance with the present invention can perform a processing properly in synchronism with arrival of data in the signal processing such as an image signal processing, without using the interrupt processing.

In the signal processing such as the image signal processing, a plurality of timers having different periods are provided as the pipeline operation resume means. In the data processing system in accordance with the present invention, the stall instruction is located just before the program for processing the data supplied in synchronism with a pulse signal generated by the predetermined timer, so that when the stall instruction is supplied to the pipelined system, the pipelined system is put into a stall condition or a wait condition in response to the decoded signal of the stall instruction.

When the data has arrived, the pipeline operation is resumed in synchronism with the pulse signal generated by the predetermined timer, so that the instruction next to the stall instruction can be executed so as to process the arrived data.

In addition, the pipelined data processing system in accordance with the present invention can select one of a plurality of timers (pipeline operation resume means) by an operand part of the stall instruction. Therefore, the pipelined data processing system in accordance with the present invention can comply with a case in which different wait conditions are required in accordance with processing hierarchical levels.

In a preferred embodiment of the pipelined data processing system in accordance with the present invention so configured that the pipeline operation is advanced one stage per one system clock, the pipeline control logic operating in synchronism with the system clock can be constructed in the pipeline control means. In addition, if it is so designed to extract the decoded signal of the stall instruction from a first execution stage, the circuit construction of the pipeline controller can be further simplified.

Moreover, in the pipelined data processing system in accordance with the present invention, when the stall instruction is transferred to a second execution stage and if an instruction next to the stall instruction is not a stall instruction, the designation of the pipeline operation resume means by the stall instruction is reset or released. Therefore, it is unnecessary to separately prepare a reset instruction for releasing the designation.

The above and other objects, features and advantages of the present invention will be apparent from the following description of preferred embodiments of the invention with reference to the accompanying drawings.

DESCRIPTION OF THE PREFERRED EMBODIMENTS

Figure 1:
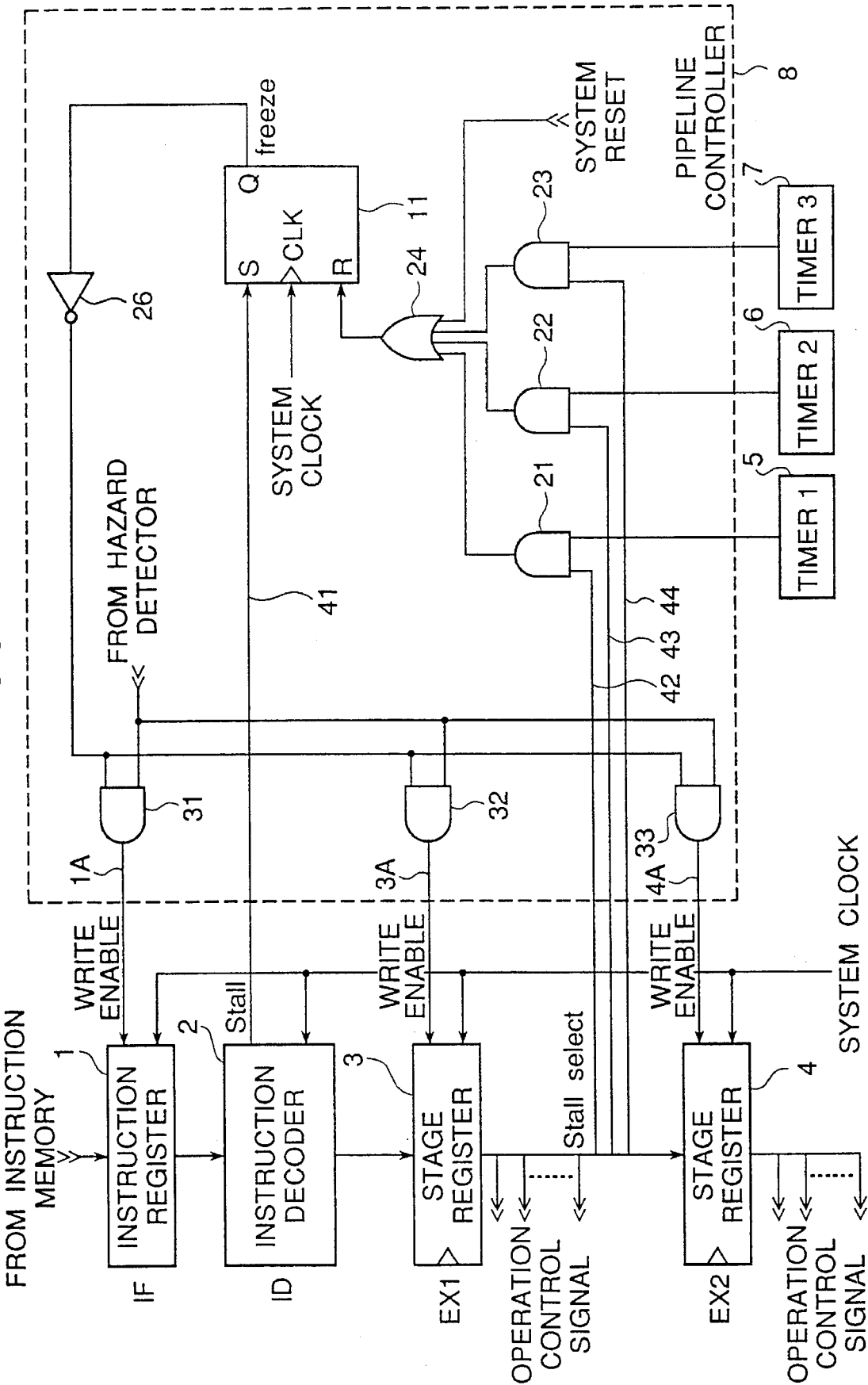
FIG. 1 is a block diagram of a first embodiment of the pipelined data processing system in accordance with the present invention.
Figure 2:
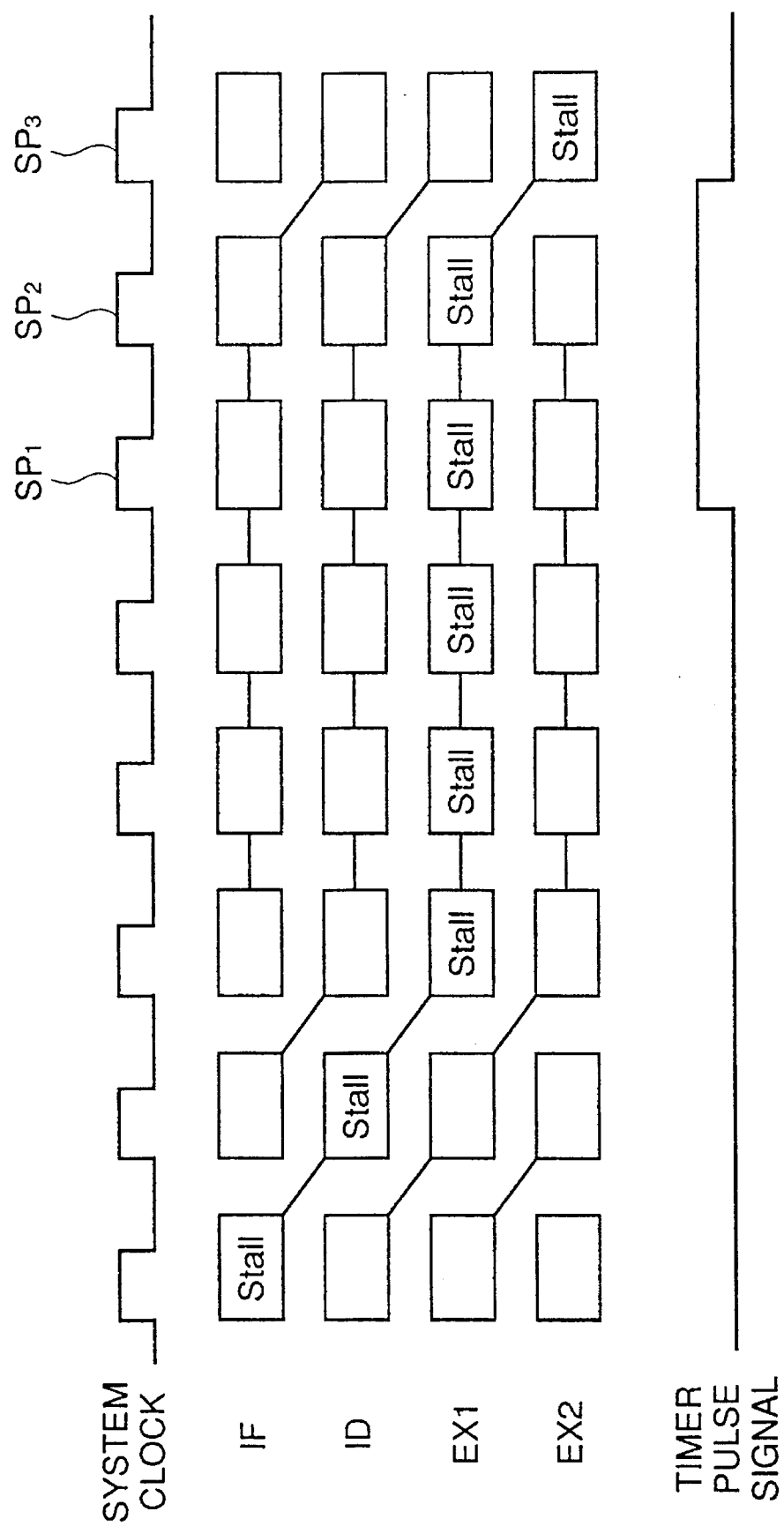
FIG. 2 is a timing chart illustrating an operation of the system shown in FIG. 1.

Referring to FIG. 1, there is shown a diagram of a first embodiment of the data processing system in accordance with the present invention. FIG. 2 is a timing chart illustrating an operation of the system shown in FIG. 1.

The data processing system shown in FIG. 1 is so configured as to make it possible that a programmed processing system such as a microprocessor and a digital signal processor can start its periodical processing in synchronism with a sampling of data for a real time processing, and a stop and a restart of a pipeline operation are controlled by a "freeze" and a "run".

In the shown embodiment, the pipelined structure is configured to basically advance one stage with one clock, in synchronism with a system clock. As shown in FIG. 1, the pipelined structure is designed to have four stages, namely, an instruction fetch stage (IF), an instruction decode stage (ID), a first execution stage (EX1) and a second execution stage (EX2).

The instruction fetch stage (IF) includes an instruction register 1 which is written with an instruction read out of an instruction memory (not shown).

The instruction decode stage (ID) includes an instruction decoder 2 coupled to the instruction register 1 for decoding the instruction held in the instruction register 1 and outputting the decoded result to a stage register 3 in the first execution stage (EX1).

In the first execution stage (EX1), an operation designated by the decoded instruction (for example, a reading of operation data from a general purpose register) is executed on the decoded result written to the stage register 3, namely, various control signals based on contents of the stage register 3. In addition, the contents of the stage register 3 are transferred to another stage register 4 in the second execution stage (EX2).

In the second execution stage (EX2), a writing of the result of execution performed in the first execution stage (EX1) (for example, a writing of operation result data to a general purpose register) is executed on information of the stage register 4, namely, various control signals based on contents of the stage register 4.

It would be understood to persons skilled in the art that, in the above operation, various not-shown functional units such as an arithmetic and logic units (ALU), ALU input buffers, ALU result buffers, and others are controlled by various control signals based on the contents of the stage registers 3 and 4. However, since these functional units are well known to persons skilled in the art, although these functionals unit are not shown in FIG. 1, the persons skilled in the art would understand the operation of the shown system in cooperation the various not-shown functional units.

The instruction register 1, the instruction decoder 2 and the stage registers 3 and 4 as mentioned above as well as the various not-shown functional units controlled by various control signals based on the contents of the stage registers 3 and 4, operate in synchronism with a system clock. In addition, the instruction register 1 and the stage registers 3 and 4 as mentioned above are controlled by write enable signals 1A, 3A and 4A from a pipeline controller 8, which in turn receives a stall signal 41 from the instruction decoder 2. Namely, the "freeze" and the "run" of the pipeline operation are controlled by the write enable signals 1A, 3A and 4A.

The pipeline controller 8 includes AND gates 31, 32 and 33, which have their output connected to a control input of these registers 1, 3 and 4, respectively, for the purpose of controlling the enable/disable of the writing to these registers. Each of the AND gates 31, 32 and 33 has its first input connected to a hazard detector (not shown), so that the writing enable/disable of the pipeline is controlled dependently upon an instruction sequence. When a pipeline hazard is detected by the hazard detector (not shown), the hazard detector outputs a logical signal of "0" to each of the AND gates 31, 32 and 33, so that the output of the AND gates 31, 32 and 33 are masked to "0", so as to inhibit the writing to the registers 1, 3 and 4.

The pipeline hazard means a situation in which an instruction cannot be executed at an appropriate cycle, for example, as in the case that an instruction for changing the content of a program counter (PC) is executed in the course of the pipeline operation. As regards details of the pipeline hazard, reference should be made to David A. Patterson and John L. Hennessy, "Computer Architecture: A Quantative Approach", 1990 by Morgan Kaufmann Publishers Inc. '§ 6.4 The Major Hurdle with Pipelining—Pipeline Hazard', pp 292–317, the disclosure of which is incorporated by reference in its entirety into this application.

Furthermore, the pipeline controller 8 includes three AND gates 21, 22 and 23, which receive at their one input an output of three timers 5, 6 and 7, respectively. These timers are configured to generate a pulse signal at a period different from one another. For example, the timer 5 generates the pulse at a constant period of 33.3 ms, and the timer 6 generates the pulse at a constant period of 2.2 ms. The timer 7 generates the pulse at a constant period of 100 ns.

This setting of the timers corresponds to an image processing in which an image of 360 pixels in a horizontal direction and 240 pixels in a vertical direction is processed at a rate of 30 images per second, by dividing each image into a plurality of rectangular sections each composed of 16 pixels×16 pixels. In this case, one period of the image processing is set to the timer 5, and a processing period of one slice of the rectangular section in the horizontal direction is set to the timer 6. In addition, the processing period for each one rectangular section is set to the timer 7.

In the shown data processing system, an instruction set includes a temporary stop instruction (called a "stall instruction") for temporarily stopping the pipeline operation. For example, this stall instruction is located in a main program just before a sub program for processing data supplied in synchronism with a pulse signal generated by a designated timer which will be explained hereinafter. An operand part of this stall instruction designates a pipeline resuming means for resuming the pipeline operation stopped for the stall instruction itself.

If the stall instruction is set in the instruction register 1 and then decoded by the instruction decoder 2, the instruction decoder 2 generates an active decoded signal 41 of the stall instruction, called a "stall signal" hereinafter. This stall signal 41 is fed to the pipeline controller 8, and applied to a set terminal S of a SR (set/reset) flipflop 11. This flipflop 11 is connected at its clock terminal CLK to receive a system clock. With this arrangement, when the stall instruction is transferred in synchronism with the system clock to the first execution stage (EX1) next to the instruction decode stage (ID), and output Q of the flipflop 11 is set to a logical level "1" in synchronism with the system clock applied to the clock terminal CLK. The output Q of the flipflop 11 is supplied through a NOT gate 26 to the other input of each of the AND gates 31, 32 and 33. Namely, the logic level "0" is applied from the NOT gate 26 to the AND gates 31, 32 and 33, the outputs of the AND gates 31, 32 and 33 are masked to the logic level "0".

Accordingly, since the write enable signals 1A, 3A and 4A generated by the AND gates 31, 32 and 33 are brought to the logic level "0", the writing to the registers 1, 3 and 4 is inhibited. As a result, the pipeline operation becomes unable to advance the stages in synchronism with the system clock. Namely, the system is put in a "frozen" condition. In this "frozen" condition of the pipeline operation, the stall instruction is stopped or held in the first execution state (EX1) as shown in FIG. 2.

An operand of the stall instruction outputted in the first execution stage (EX1) includes stall select signals 42, 43 and 44, which are supplied to the other input of the AND gates 21, 22 and 23 for selecting the pulse signals generated by the timers 5, 6 and 7. Outputs of the AND gates 21 22 and 23 are supplied to an OR gate 24, which has its output connected to a reset terminal R of the flipflop 11.

When the timer 5 is to be selected, the stall select signal 42 is brought to the logic level "1", so that the AND gate 21 is opened and the pulse signal generated by the timer 5 passes through the AND gate 21 and the OR gate 24 to be inputted to the reset terminal R of the flipflop 11. Therefore, the output Q of the flipflop 11 is reset to the logic level "0" in synchronism with the system clock appearing just after the reset terminal of the flipflop has been brought to the logic level "1". Incidentally, the flipflop 11 is so configured that, when the logic level "1" is simultaneously applied to both of the set terminal S and the reset terminal R of the flipflop, the resetting has preference over the setting.

If the ouput Q of the flipflop 11 is brought to the logic level "0", the output of the NOT gate 26 is brought to the logic level "1", so that the mask of the AND gates 31, 32 and 33 is released. Thus, the outputs of these AND gates 31, 32 and 33 set the write enable signals 1A, 3A and 4A to the logic level "1", if there is no other cause for temporary stop such as a hazard. Accordingly, the pipeline operation is returned to the "run" condition.

Incidentally, the OR gate 24 is also connected to receive, in addition to the outputs of the AND gates 21, 22 and 23, a signal (for example, a system reset signal) for putting the pipeline system into the "run" condition for any other cause.

If the pipelined system is put in the "run" condition, the information of the stall instruction is moved to the second execution stage (EX2), and the operand signals of the stall instruction, namely, the stall select signals 42, 43 and 44 are reset to the logic level "0" unless the next instruction supplied to the first execution stage (EX1) is the stall instruction.

In order to ensure the transient of the pipelined system from the "frozen" condition to the "run" condition, the output pulses of the timers 5, 6 and 7 are maintained at the logic level "1" for a period of two system clocks. The reason for this is that in the shown embodiment, the output pulses of the timers 5, 6 and 7 are outputted in synchronism with the system clock, and the operation of the flipflop 11 is in synchronism with the system clock. If the output pulses of the timers 5, 6 and 7 are asynchronous to the system clock, it is sufficient if the output pulses of the timers 5, 6 and 7 have a predetermined pulse width for ensuring a setup time and a hold time of the SR flipflop 11 in relation with the system clock applied to the clock terminal CLK.

In FIG. 2, at a rising edge of a second system clock SP2 of two system clocks SP1 and SP2 included in the logic level "1" period of the timer output pulse signal, a control for putting the pipelined system into the "run" condition is executed. Namely, the stall instruction in the first execution stage (EX1) is transferred at the rising edge of the second system clock SP2 to the register 4 in the second execution stage (EX2). The instruction is latched in the register 4 in response to a rising edge of a system clock SP3 next to the system clock SP2.

In the embodiment shown in FIG. 1, the stall select signals 42, 43 and 44 correspond to three bits of the operand part of the stall instructions in one-to-one relation. Namely, three bits of the operand part of the stall instructions are allocated for selecting the three timers 5, 6 and 7, and each one bit of the three bits of the operand part of the stall instructions corresponds to one stall select signal. However, only two bits of the operand part of the stall instructions are allocated for selecting the three timers 5, 6 and 7, and the two bits are decoded to generate the three different stall select signals 42, 43 and 44.

In the shown embodiment, the clock-synchronized SR flipflop 11 is used as a memory means for storing the "freeze" and the "run" of the pipelined system. However, this memory means is not limited to the clock-synchronized SR flipflop, but can be composed of other circuits such as an asynchronous flipflop.

In addition, the shown embodiment is such that since the data processing system is configured to process the image signal, a means for resuming the pipeline operation is composed of the timers for generating a pulse signal at various predetermined periods. However, the means for resuming the pipeline operation is not limited to the timers mentioned above, but can be constituted of any external, peripheral or processing means capable of generating a predetermined trigger signal for resuming the pipelined operation.

Figure 3:
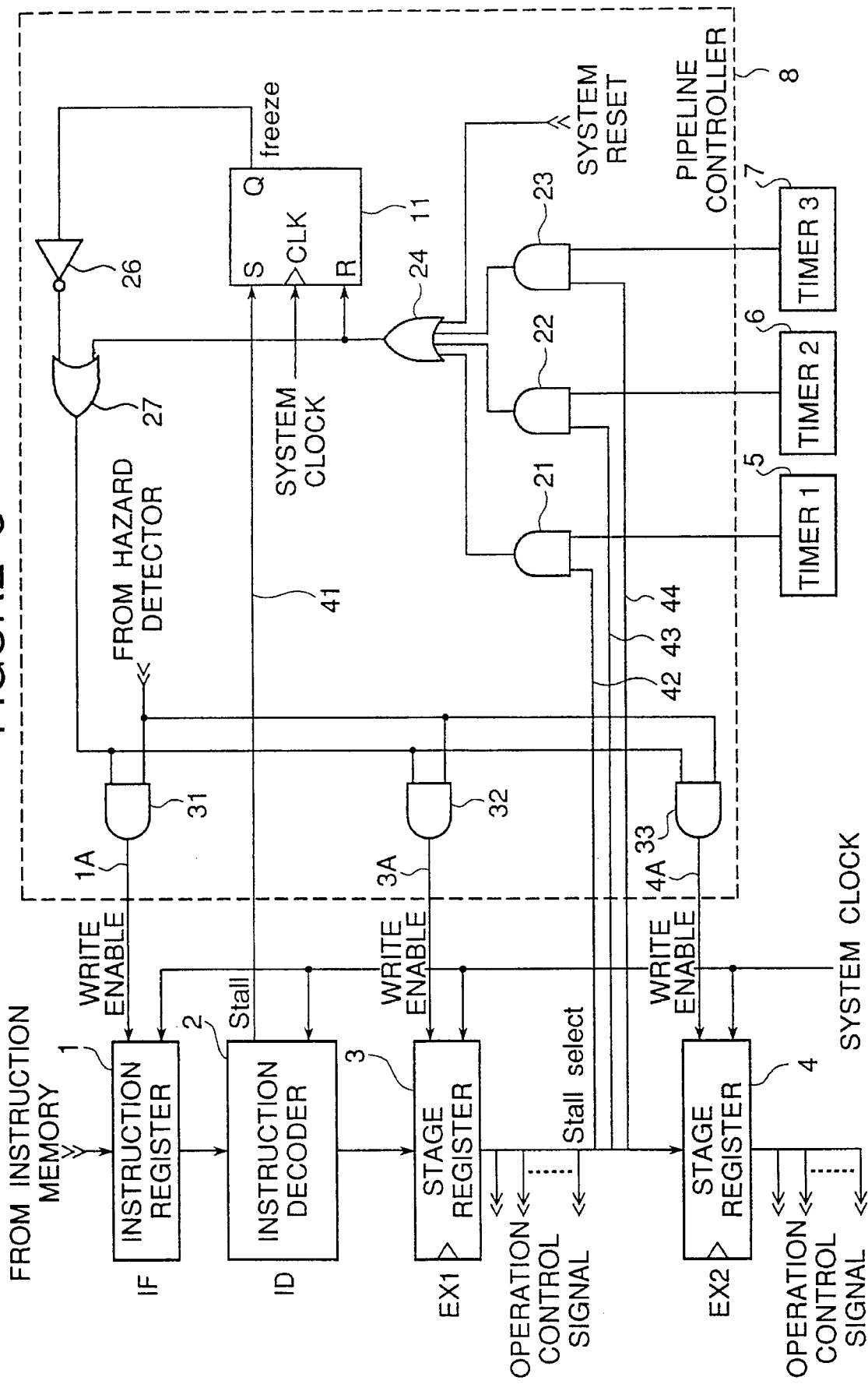
FIG. 3 is a block diagram of a second embodiment of the pipelined data processing system in accordance with the present invention.
Figure 4:
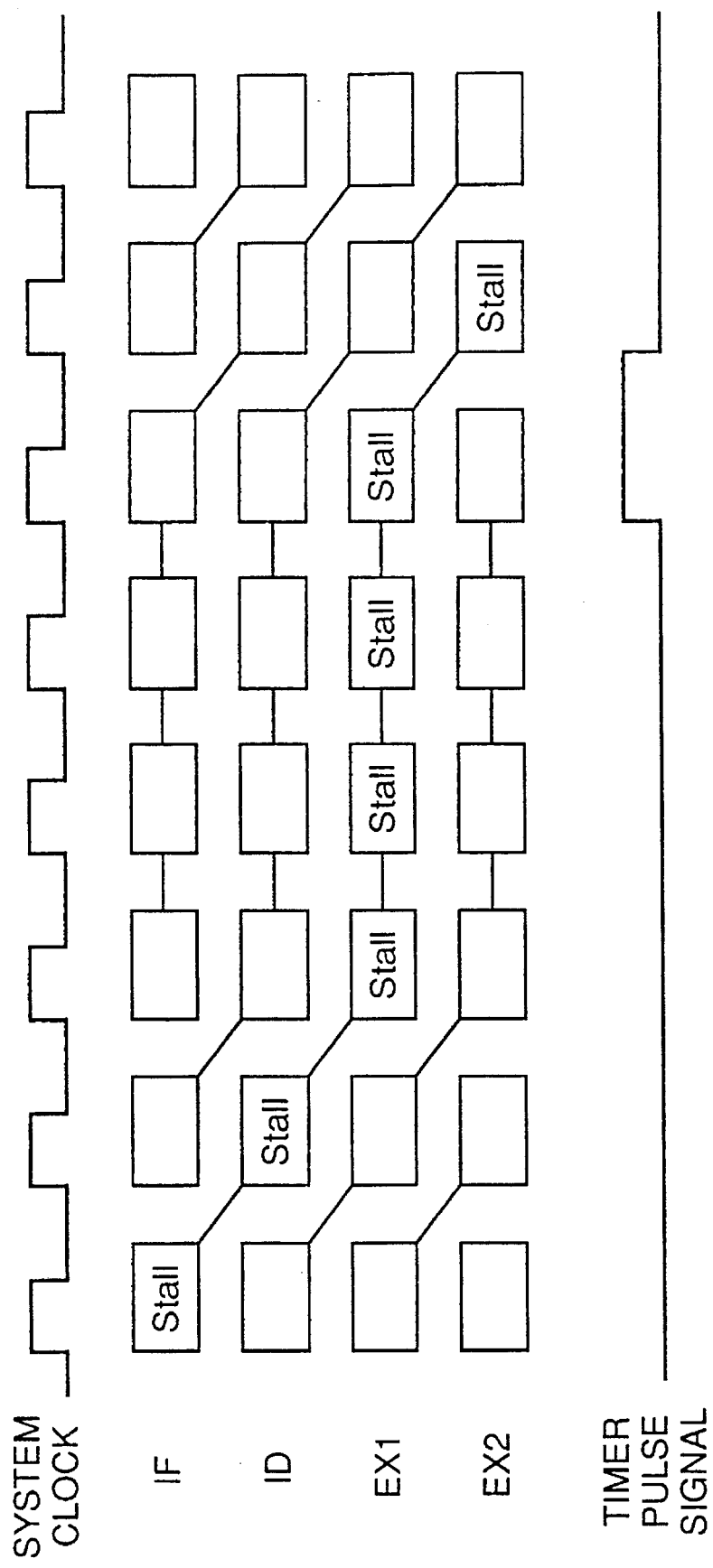
FIG. 4 is a timing chart illustrating an operation of the system shown in FIG. 3.

Referring to FIG. 3, there is shown a diagram of a second embodiment of the data processing system in accordance with the present invention. FIG. 4 is a timing chart illustrating an operation of the system shown in FIG. 3. In FIG. 3, elements similar to those shown in FIG. 1 are given the same Reference Numerals, and explanation thereof will be omitted.

As clear from a comparison between FIGS. 1 and 3, the second embodiment shown in FIG. 3 is characterized in that an OR gate 27 is added to the first embodiment shown in FIG. 1. This OR gate 27 has its first input connected to the ouput of the NOT gate 26 and its second input connected to the output of the OR gate 24, an output of the OR gate 27 being connected to the other input of each of the AND gates 31, 32 and 33.

It would be apparent to persons skilled in the art that, the second embodiment operates similar to the first embodiment when the pipeline operation is put into the "frozen" condition. When the pipeline operation is resumed, the pulse signal from the output pulses of the timers 5, 6 and 7 by an active signal of the operand signals namely stall select signals 42, 43 and 44, is supplied through the OR gates 24 and 27 to the AND gates 31, 32 and 33 through no clock-synchronized means. Therefore, when the pipeline operation is resumed, a delay of one clock caused by the clock-synchronized SR flipflop 11 can be removed, as will be seen from FIG. 4.

In the second embodiment, therefore, since the pipeline operation can be brought into the "run" condition in the same clock period as that of the output pulse of the timers 5, 6 and 7, it is sufficient if the pulse signal of the timers 5, 6 and 7 is maintained at the logic level "1" for only one clock period.

Figure 5:
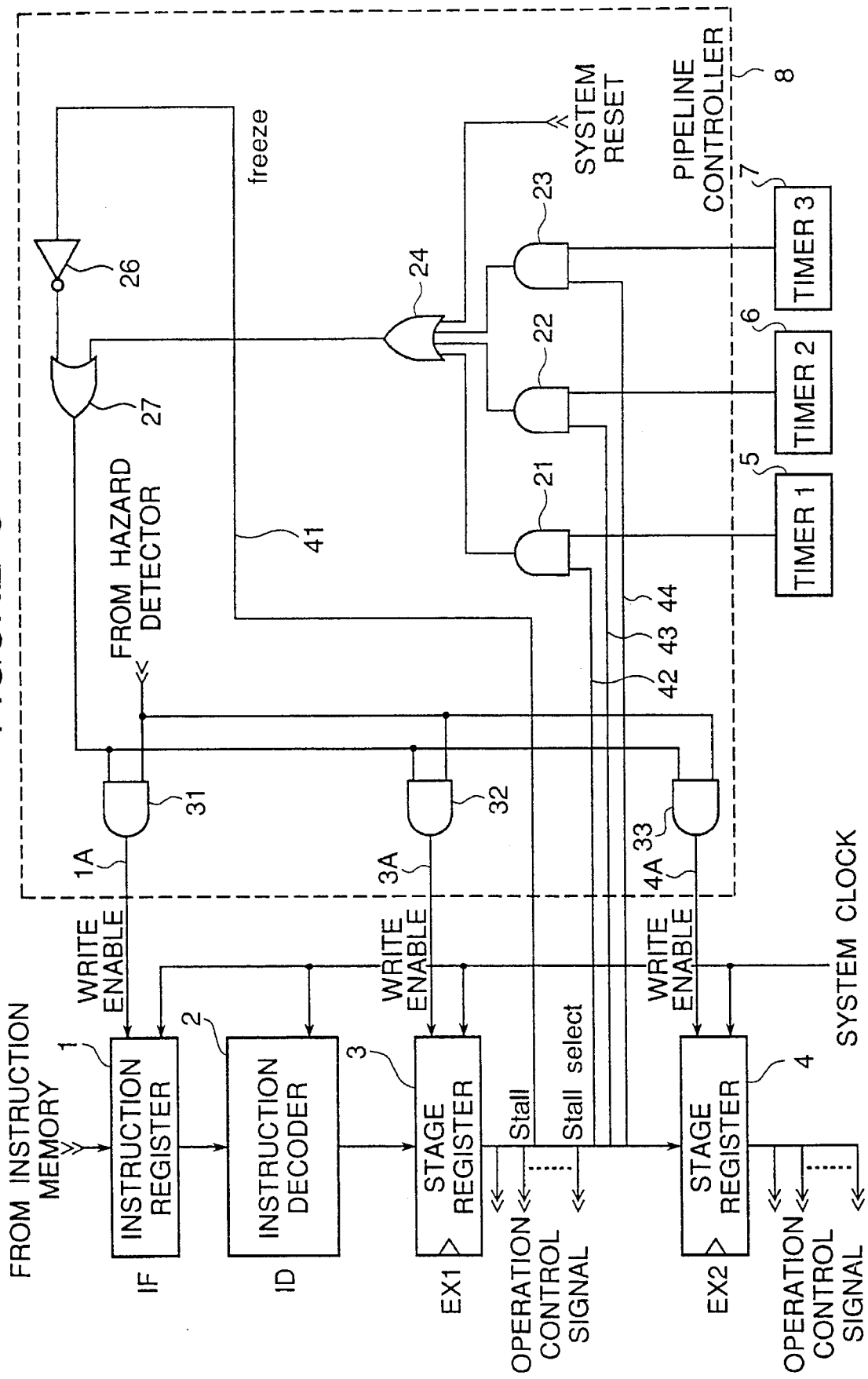
FIG. 5 is a block diagram of a third embodiment of the pipelined data processing system in accordance with the present invention.

Referring to FIG. 5, there is shown a diagram of the third embodiment of the data processing system in accordance with the present invention. In FIG. 5, elements similar to those shown in FIGS. 1 and 3 are given the same Reference Numerals, and explanation thereof will be omitted.

As clear from a comparison between FIG. 5 and FIGS. 1 and 3, the third embodiment shown in FIG. 5 is characterized in that the decoded signal or stall signal 41 of the stall instruction is extracted from the register 3 in the first execution stage (EX1), not from the instruction decoder 2 in the instruction decode stage (ID), and supplied through the NOT gate 26 to the OR gate 27. On the other hand, the SR flipflop 11 provided in the first and second embodiments for controlling the "freeze" and the "run" of the pipeline operation, is omitted.

In the third embodiment, the stall instruction is transferred and executed in the first execution stage (EX1), so that the decoded signal of the stall instruction, namely, the stall signal 41 is generated and supplied to the NOT gate 26 as the "freeze" signal. In addition, the operand signal of the stall instruction, namely, the stall select signals 42, 43 and 44 are generated in the first execution stage (EX1).

The stall signal 41 of the logic level "1" inverted to the logic level "0" by the NOT gate 26, so as to mask the output of the AND gates 31, 32 and 33 to the logic level "0" through the OR gate 27. As a result, the registers 1, 3 and 4 in the different stages of the pipelined structure are inhibited from writing, and the stall instruction is stopped or held in the first execution stage (EX1).

The transition of the pipeline operation from the "frozen" condition to the "run" condition is the same as that in the second embodiment and therefore, is carried out as shown in FIG. 4.

As mentioned above, the pipelined data processing system in accordance with the present invention is advantageous in that it is possible to resume the pipeline operation precisely in synchronism with the timer signal. In addition, no interrupt processing is required in a processing (such as a signal processing) corresponding to arrival of data, and the stoppage and the resumption of the pipeline operation can be controlled in a main program. Furthermore, it is possible to selectively designate a plurality of operation resume factors. Accordingly, a real-time high speed synchronous signal processing can be performed.

Moreover, since the pipeline data processing system in accordance with the present invention can control the resumption of the pipeline operation directly on the basis of the timer signal, it is possible to easily minimize a clock delay from the generation of the timer signal to the actual resumption of the pipeline operation resume.

In addition, the pipelined data processing system in accordance with the present invention can select one of a plurality of timer signals by an operand part of the stall instruction. Therefore, the pipelined data processing system in accordance with the present invention can comply with a case in which different wait conditions are required in accordance with a case in which different wait conditions are required in accordance with processing hierarchical levels.

In a preferred embodiment of the piplined data processing system in accordance with the present invention so configured that the pipeline operation is advanced one stage per one system clock, the pipeline control logic operating in synchronism with the system clock can be constructed in the pipeline controller. In addition, if it is so designed to extract the decoded signal of the stall instruction from a first execution stage, the circuit construction of the pipeline controller can be further simplified.

The invention has thus been shown and described with reference to the specific embodiments. However, it should be noted that the present invention is in no way limited to the details of the illustrated structures but changes and modifications may be made within the scope of the appended claims.

The invention claimed is:

1. A data processing system having a pipelined structure in which an instruction execution process is divided into a plurality of stages, the data processing system having an instruction set containing a stall instruction, and comprising:

pipeline control means for controlling an execution and stall of a pipeline operation; and a plurality of pipeline operation resume means selected according to said stall instruction, where a timing signal of resuming said pipeline operation is generated, said pipeline control means for putting said stages into a "frozen" condition based on a stall signal generated by execution of said stall instruction, and for returning said "frozen" condition to a "run" condition based on said timing signal generated by said pipeline operation resume means designated by an operand included in said stall instruction such that processing is performed in synchronism with arrival of data without an interrupt processing.

2. A data processing system claimed in claim 1 wherein said stall instruction includes an operand part designating said pipeline operation resume means.

3. A data processing system claimed in claim 1 wherein said pipeline control means includes memory means for storing a setting and a releasing of the stall of the pipeline operation, said memory means having a set terminal connected to receive a decoded signal of said stall instruction outputted from an instruction decode stage in the pipelined structure, an output of said memory means being supplied to a plurality of stage registers in the pipelined structure so as to inhibit a writing to each of said stage registers when said memory means is in a set condition, said memory means also including a reset terminal connected to receive said timing signal generated by said pipeline operation resume means designated by said stall instruction, so that when said memory means is in a reset condition, the writing to each of said stage registers is allowed.

4. A data processing system claimed in claim 1 wherein said pipeline control means includes memory means for storing a setting and a releasing of the stall of the pipeline operation, said memory means having a set terminal connected to receive a decoded signal of said stall instruction outputted from an instruction decode stage in the pipelined structure, an output of said memory means being supplied through gate means to a plurality of stage registers in the pipelined structure so as to inhibit a writing to each of said stage registers when said memory means is in a set condition, said timing signal generated by said pipeline operation resume means designated by said stall instruction being supplied to a reset terminal of said memory means and said gate means, so that said memory means is put into a reset condition and said timing signal is supplied through said gate means to each of said stage registers so as to allow the writing to each of said stage registers.

5. A data processing system claimed in claim 1 wherein said pipeline control means includes gate means for storing a setting and a releasing of the stall of the pipeline operation, an output of said gate means being connected to a control input of each of a plurality of stage registers in the pipelined structure, a decoded signal of said stall instruction outputted from an instruction decode stage in the pipelined structure being supplied to said gate means so as to inhibit a writing to each of said stage registers, said timing signal generated by said pipeline operation resume means designated by said stall instruction being also supplied to said gate means so as to allow the writing to each of said stage registers.

6. A data processing system claimed in claim 1 wherein said pipeline control means includes selection means for selecting from a plurality of pipeline operation resume means, one pipeline operation resume means designated by said stall instruction.

7. A data processing system claimed in claim 1 wherein said pipeline control means includes means for resetting the designation of the pipeline operation resume means by said stall instruction, when said stall instruction is transferred to a second execution stage and if an instruction following said stall instruction is not a stall instruction.

8. A data processing system claimed in claim 1 wherein said pipeline operation resume means includes at least one timer periodically generating a predetermined pulse signal.

9. A data processing system according to claim 1, wherein said pipeline operation is resumed in synchronism with the timing signal of said pipeline operation resume means designated by said stall instruction, and wherein said timing signal is directly supplied to said pipeline control means.

10. A data processing system according to claim 1, wherein said pipeline control means includes a plurality of timers each periodically generating a predetermined pulse signal different from others of said plurality of timers.

11. A data processing system according to claim 1, said data processing system receiving a system clock, wherein said pipeline control means operates in synchronism with said system clock, a pipeline operation of said data processing advancing one stage per system clock.

12. A data processing system according to claim 1, wherein said pipeline control means includes means for resetting the designation of the pipeline operation resume means by said stall instruction, when said stall instruction is transferred to a second execution stage and if an instruction following said stall instruction is not a stall instruction, a resetting operation by said means for resetting being devoid of a separate reset instruction for releasing the designation.

13. A data processing system according to claim 1, wherein said pipeline operation resume means comprises a plurality of timers and said pipeline control means includes a plurality of AND gates, respective AND gates of said plurality of AND gates receiving at a first input thereof an output from a respective one of said plurality of timers.

14. A data processing system according to claim 1, wherein said pipeline operation is resumed in synchronism with said timing signal generated by said pipeline operation resume means.

* * * * *